United States Patent [19]

Diaconu et al.

[11] Patent Number: 4,894,528
[45] Date of Patent: Jan. 16, 1990

[54] LASER BEAM LAWN TENNIS NET REFEREE

[76] Inventors: Sever Diaconu; Alen Diaconu, both of P.O. Box 9517, Hickory, N.C. 28603

[21] Appl. No.: 209,186

[22] Filed: Jun. 20, 1988

[51] Int. Cl.[4] .................... G01V 9/04; G08B 23/00
[52] U.S. Cl. ....................... 250/222.1; 340/323 R
[58] Field of Search .................... 250/221, 222.1; 340/323 R; 273/29 B, 29 BA, 31; 364/410

[56] References Cited

U.S. PATENT DOCUMENTS

| | | | |
|---|---|---|---|
| 3,415,517 | 12/1968 | Krist | 340/323 R |
| 3,810,148 | 5/1974 | Karsten et al. | 340/323 R |
| 3,982,759 | 9/1976 | Grant | 340/323 R |
| 4,004,805 | 1/1977 | Chen et al. | 250/221 |
| 4,423,998 | 1/1984 | Inada et al. | 250/222.1 |
| 4,528,548 | 7/1985 | Oberan | 340/323 R |

Primary Examiner—Edward P. Westin
Assistant Examiner—Michael Messinger
Attorney, Agent, or Firm—Lynn E. Barber

[57] ABSTRACT

Low intensity laser oscillators produce precisely located beams on each side of the net detected by laser receivers on the opposite end of the net along with appropriate electronics to monitor and announce each time that the served balls intercept the beams and cause the laser beams to not be detected by the appropriate receiver.

5 Claims, 1 Drawing Sheet

LASER BEAM LAWN TENNIS NET REFEREE

BACKGROUND OF THE INVENTION

1. Field of the Invention

This invention relates to a lawn tennis sport that provides a means of monitoring "net faults" without errors and indicates when the served balls touch the net. Laser sensors and appropriate electronics produce audio announcements according to the lawn tennis rules.

2. Description of the Related Art

Human judgment of net faults is fairly accurate but referees must carefully watch the net during the serving to make these judgments. Such careful monitoring of the net is quite difficult and expensive.

The previous systems that have been developed in an attempt to replace human monitoring have been shown to be too fragile, and therefore human referees have continued to be used. In some cases, only one direct hit on the net has been found to damage the sensors of previous systems. Our system is based upon compact equipment boxed in shock proof containers implanted inside the net poles of the court and out of court away from any possible racket hit.

SUMMARY OF THE INVENTION

Laser oscillators produce low intensity beams that are aimed along each side of the net, with one oscillator provided for each half of the net. These beams control the appropriate laser receivers mounted inside the same poles but in opposite positions. The laser receivers are connected to electronic equipment which announces each time when the ball breaks through the laser beams, covering completely the optical contact between the oscillator and the receiver. Those balls breaking through the laser beams are the net fault balls and the fault is announced by the suitable electronics part of the system.

DETAILED DESCRIPTION

In the following discussion, the terms "right side" and "left side" when used with respect to the net 24 refer to the respective portions of the net 24 that are to the right and left of th depressed center of the net 24 as viewed by a particular player. The terms "front side" and "back side" of the net mean the areas along the net parallel to the net, that are nearest to, and farthest from, a particular player, respectively. The two portions of the court on either side of the net, one for a particular player or team and the other for the opponent(s), are termed "halves".

Figure 1:
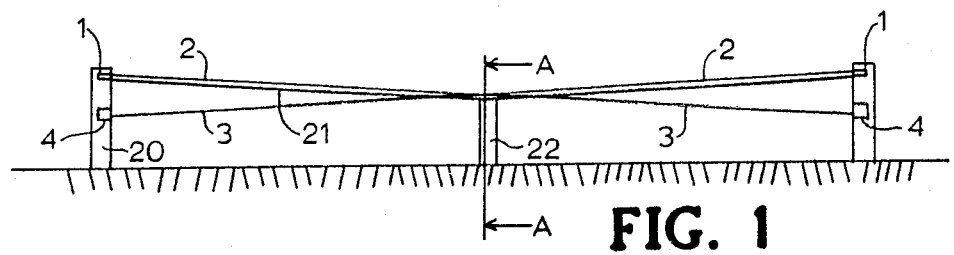
FIG. 1 shows a general view of the net at one side with the laser oscillators of the invention positioned for one side of the court.

As mentioned above, the center of the net edge 21 is depressed downwardly such as by means of a net band 22 and net tie 23. Laser oscillator 1 (FIG. 1) is a low intensity oscillator of any suitable type. The light energy may be the infra red type or other suitable light energy. A total of four such laser oscillators are used, with two oscillators comprising a unit for monitoring each half of the court. The laser oscillators 1 (radiation sources) and the laser receivers 4 are mounted inside the court poles 20 when possible or to the bottom of the court poles 20 when the court conditions do not permit mounting inside the court poles. The oscillator output from each pole 20 is detected by the receiver 4 mounted inside the pole 20 on the other side of the court. Each oscillator laser beam has a first half 2 that extends parallel to the top of the net from a pole on one side of the court downward to the lowered net center (FIG. 1). The second half 3 of each laser beam extends from the lowered center of the net to the receiver on the opposite pole to close the optical circuit. Two laser beams, one on the front side and one on the back side of the net, project from a source on each pole 20 and monitor balls coming toward the net between that pole 20 and the linear center of the net.

One of the laser sources on each pole is placed slightly to the front side of the net and the second laser beam on that pole is placed on the back side of the net (FIG. 2) with a distance 7 between the beams to enable monitoring net faults as discussed below.

The laser beams, particularly the first half 2 used for monitoring have very precise spatial positions with respect to the net. The precise positions of the laser beams along the net are adjusted by the way the devices are mounted inside the poles and by fine screws, and other common mechanical gear which permit fine adjustments.

Figure 2:
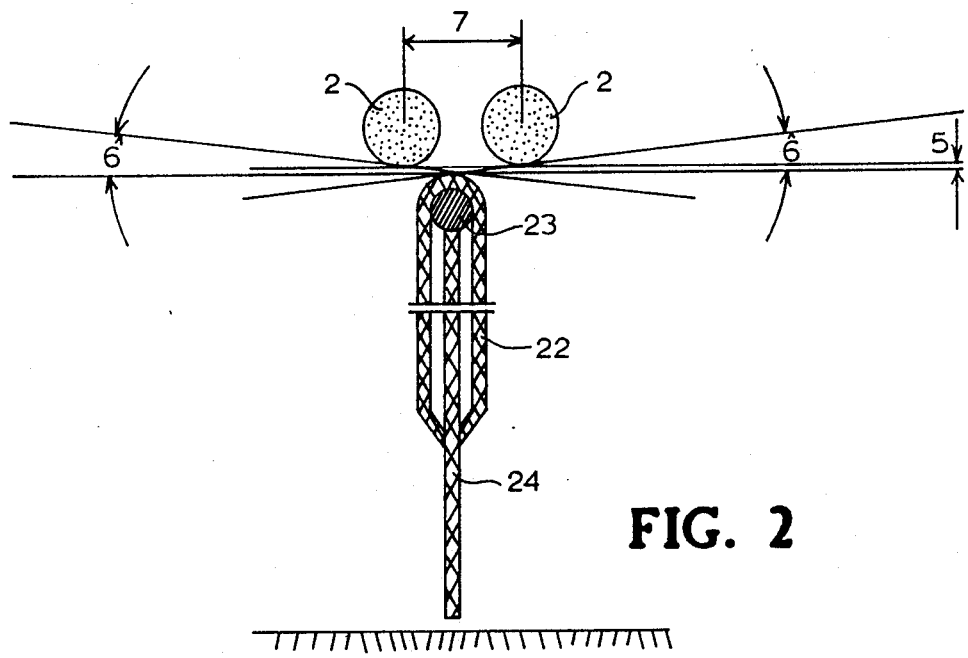
FIG. 2 shows a transverse sectional view of the net at A—A, showing that there are two laser beams, one for each side of the net in each half court.

FIG. 2 shows a transverse schematic view of the active laser beams in a plane A—A.

When the ball goes near to the net but does not touch it, the ball will not completely block either beam, so neither laser beam will be completely covered, and the optical contact between the oscillator 1 and its matched receiver will not be broken.

There are two types of ball projectories that result in a net fault: the balls touching the net as a tangent (descending from above) and the balls which intersect the net like a secant does (ascending from below).

Served balls coming from above the top of the net that touch the net will completely cover the first half of the laser beam that is on that side (right or left side) of the lowered center of the net and is on the serving player's side of the net (front side), and will cause the optical circuit to the receiver for that beam to be broken.

Thus, in FIG. 2 a ball coming from above right toward the net top at angle 5 above the horizontal plane at the top of the net will block the beam 2 shown on the right in FIG. 2. Angle 5, is formed between (a) a line extending from the net top to the lowest edge of the nearest laser beam and (b) a horizontal line at the net top.

Served balls coming from below the top of the net that touch the net will completely cover the laser beam that is on that side (left or right) of the lowered center of the net but is on the server's opponent's side of the net (back side for the server). Thus, in FIG. 2, a ball coming upward along line 6 toward the net top from the right will block the beam that is on the far side of the net (shown on the left in FIG. 2).

Figure 3:
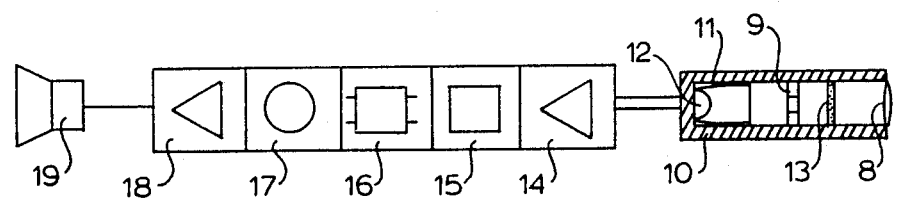
FIG. 3 shows in schematic bloc from the laser beam receiver in accordance with this invention.

FIG. 3 is a schematic bloc diagram of the laser receivers 4. Optical lens 8 which focuses the laser beams, and limiting diaphragm 9 are held by a small metallic tube 10. Concentrating mirror 11 helps with collecting the laser beams. Optical sensor 12, a photo diode, receives the light energy and commands the appropriate receivers. When the photo diode 12 receives light energy from the laser beam it keeps the logical status of its receiver at "0" level. When the optical contact is broken, as when the laser beam 15 is interrupted by a served fault ball, the diode 12 does not receive any more light energy, its inner ohmic resistance increases, and the logical status changes from "0" level to "1". The photo sensitive diode 12 is protected against any random light energy by a filter 13. A high gain transistorized amplifier 14 enables amplification of the signal. A trigger 15 feeds a monostable circuit 16, which commands an audio generator 17. The audio generator 17 is connected to an audio power amplifier 18. The audio power amplifier 18 activates a certain number of loud speakers 19 according to the requirements of the court.

We claim:

1. A monitoring system for net faults in a net game, wherein said net game comprises a court with a central net, said net having two ends and an upper edge and having a lowered net center, said system comprising two pairs of radiation sources, each pair being positioned on an opposite side of the court from the other pair, wherein the radiation sources in each pair are positioned on opposite sides of the upper edge of the net from one another, with each radiation source positioned higher than the net and projecting a radiation beam at a downward angle from near one end of the net to a receiver near the other end of the net, said beam extending parallel to the upper edge of the net between the source and the lowered net center.

2. A monitoring system according to claim 1, wherein each of said sources and receivers is mounted on poles to which the net is attached.

3. A monitoring system according to claim 1, wherein the radiation sources comprises infra red radiation.

4. A monitoring system according to claim 1, wherein the receiver comprises a photosensitive diode and an audio generator responsive to interruptions in the radiation from the beam.

5. A method for monitoring net faults along a net having a lowered center and two ends, comprising the steps of:

(a) providing two pairs of laser beams, each of said laser beams projecting downwardly from a separate source, each source located near one end of the net, said beam projecting along and parallel to the nearest half of the net to the source and continuing from the lowered center of the net toward a receiver, the sources in each pair being positioned at the same end of the net of opposite sides of the net and the two sources in each pair being positioned at the opposite end of the net from the sources in the remaining pair;

(b) detecting a break in transmission of a beam to a receiver; and (c) generating an audio signal in response to detection of the break in transmission.

* * * * *

UNITED STATES PATENT AND TRADEMARK OFFICE
CERTIFICATE OF CORRECTION

PATENT NO. : 4,894,528

DATED : January 16, 1990

INVENTOR(S) : Sever Diaconu and Alen Diaconu

It is certified that error appears in the above-identified patent and that said Letters Patent is hereby corrected as shown below:

Column 1, line 55: replace "th" with --the--.

Signed and Sealed this

Eighth Day of January, 1991

*Attest:*

HARRY F. MANBECK, JR.

*Attesting Officer*      *Commissioner of Patents and Trademarks*